United States Patent
Bostick et al.

(10) Patent No.: US 8,996,779 B2
(45) Date of Patent: Mar. 31, 2015

(54) SERVICE ORIENTED ARCHITECTURE SERVICE DEPENDENCY DETERMINATION

(71) Applicant: International Business Machines Corporation, Armonk, NY (US)

(72) Inventors: James E. Bostick, Cedar Park, TX (US); John M. Ganci, Jr., Cary, NC (US); Raghuraman Kalyanaraman, Round Rock, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/915,761

(22) Filed: Jun. 12, 2013

(65) Prior Publication Data

US 2014/0372630 A1   Dec. 18, 2014

(51) Int. Cl.
G06F 3/00     (2006.01)
G06F 3/06     (2006.01)

(52) U.S. Cl.
CPC .................................. *G06F 3/0659* (2013.01)
USPC ............................. 710/305; 710/5; 707/603

(58) Field of Classification Search
USPC ..................... 710/305, 5; 707/603
See application file for complete search history.

(56) References Cited

U.S. PATENT DOCUMENTS

| | | | |
|---|---|---|---|
| 2007/0094256 A1* | 4/2007 | Hite et al. ...................... 707/6 |
| 2008/0065656 A1* | 3/2008 | Theeten et al. ................ 707/100 |
| 2009/0055888 A1* | 2/2009 | Little .............................. 726/1 |
| 2010/0161629 A1 | 6/2010 | Palanisamy et al. |
| 2011/0029479 A1 | 2/2011 | Novak et al. |
| 2011/0145278 A1 | 6/2011 | Maes |
| 2011/0153610 A1 | 6/2011 | Carrato et al. |
| 2011/0179046 A1* | 7/2011 | Paull et al. ..................... 707/754 |
| 2011/0246635 A1 | 10/2011 | Phukan |
| 2012/0042040 A1 | 2/2012 | Bailey et al. |

OTHER PUBLICATIONS

Wikipedia, "Enterprise service bus—Wikipedia, the free encyclopedia", Apr. 10, 2013, pp. 1-10, <http://en.wikipedia.org/w/index.php?title=Enterprise_service_bus&oldid=549623923>.

* cited by examiner

*Primary Examiner* — Farley Abad
(74) *Attorney, Agent, or Firm* — Stephen R. Yoder (57) ABSTRACT

Service dependency is determined for services in a service oriented architecture (SOA) environment. The steps in determining service dependency include: recording a first triple describing a first service call where the first service calls the second service, and determining the first service is dependent upon the second service based, at least in part, upon the first triple. The recording action is performed dynamically, the recording occurring when the first service call is made. Other related steps include recording the first triple to a timestamp indicating when the first service call is made.

15 Claims, 5 Drawing Sheets

SERVICE ORIENTED ARCHITECTURE SERVICE DEPENDENCY DETERMINATION

FIELD OF THE INVENTION

The present invention relates generally to the field of service oriented architecture (SOA) style software, and more particularly to determination of dependencies between services in an SOA environment.

BACKGROUND OF THE INVENTION

In a large-scale SOA environment it can be difficult to know what application is consuming what service. In some SOA environments, there may be as many as thousands (if not tens of thousands) of atomic services. Atomic services that can be called by other services are rapidly assembled into larger scale applications (also called composite services). The above scenario is generally a positive development because it leads to reuse of services at the atomic and/or composite levels. This is a well known advantage of SOA.

An enterprise service bus (ESB) is a known software architecture model effecting communication between mutually interacting software applications in an SOA environment. It is considered useful in enterprise application integration (EAI) of heterogeneous and complex landscapes. An ESB typically includes the following duties and/or characteristics: (i) transports the design concept of modern operating systems to networks of disparate and independent computers; (ii) provide for commodity services like event handling, data transformation and mapping, message and event queuing and sequencing, security or exception handling, protocol conversion; (iii) adoption, translation and routing of a client request to the appropriate answering service; (iv) monitor and control routing of message exchange between services; (v) resolve contention between communicating service components; (vi) control deployment and versioning of services; (vii) marshal use of redundant services; and (viii) enforcing proper quality of communication service.

SUMMARY

Embodiments of the present invention disclose a method, computer program, and system for determining a dependency of a first service upon a second service in a service oriented architecture environment. The process of determination includes: (i) recording a first triple describing a first service call where the first service calls the second service; and (ii) determining the first service is dependent upon the second service based, at least in part, upon the first triple. The recording action is performed dynamically, the recording occurring when the first service call is made. At least the recording and determining actions are performed by computer software running on computer hardware.

DETAILED DESCRIPTION

This Detailed Description section will be divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
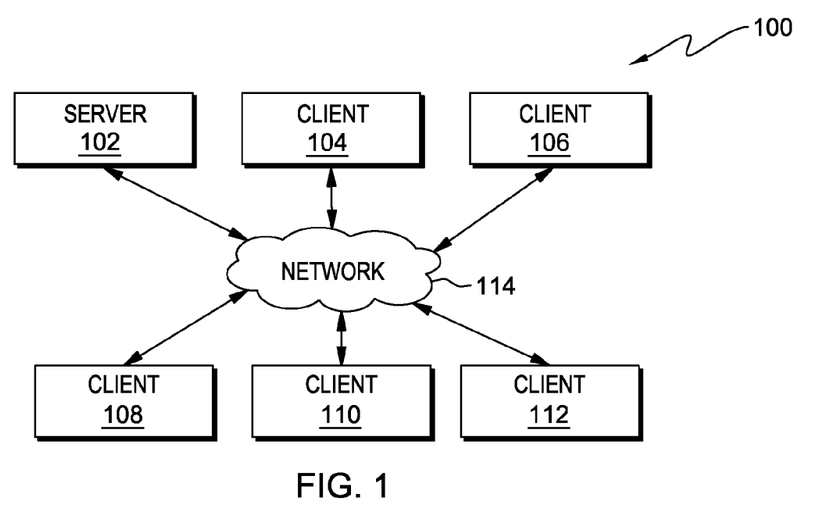
FIG. 1 is a schematic view of a first embodiment of a computer system (that is, a system including one or more processing devices) according to the present invention.
Figure 2:
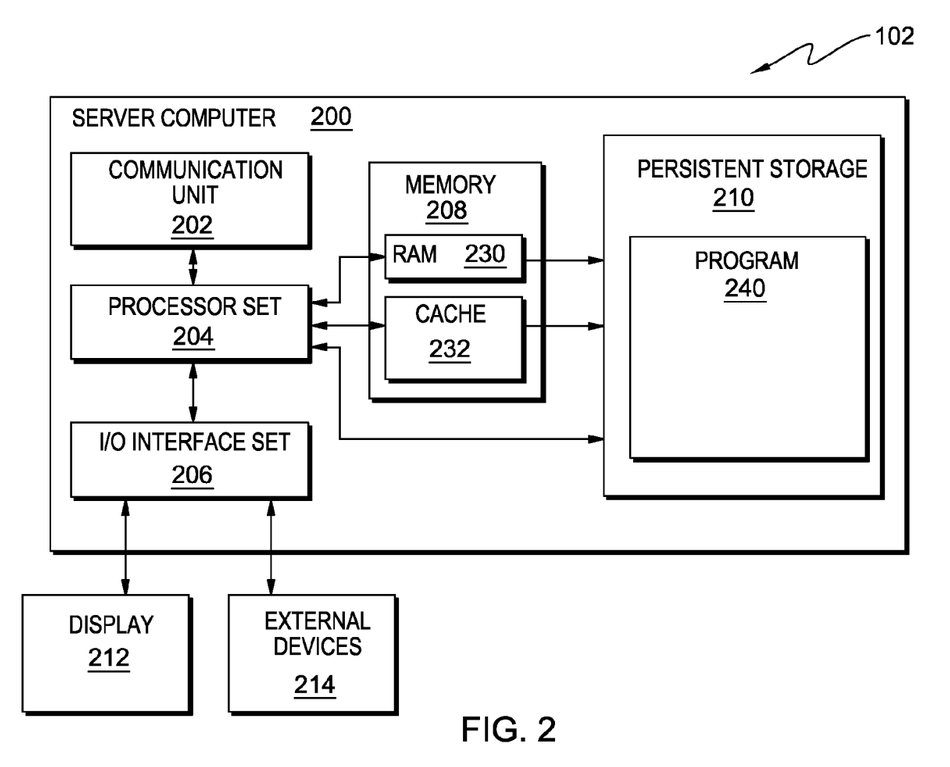
FIG. 2 is a schematic view of a computer sub-system (that is, a part of the computer system that itself includes at least one processing device) portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes at least one computer) 102; client computer sub-systems 104, 106, 108, 110, 112; communication network 114; server computer 200; communication unit 202; processor set 204; input/output (i/o) unit 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a representative piece of software, and is a collection of machine readable instructions and data that is used to create, manage and control certain software functions that will be discussed in detail, below, in the Operation of the Embodiment(s) sub-section of this DETAILED DESCRIPTION section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is in many respects representative of the various software modules of the present invention and is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation Of Embodiment(s) Of The Present Invention

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
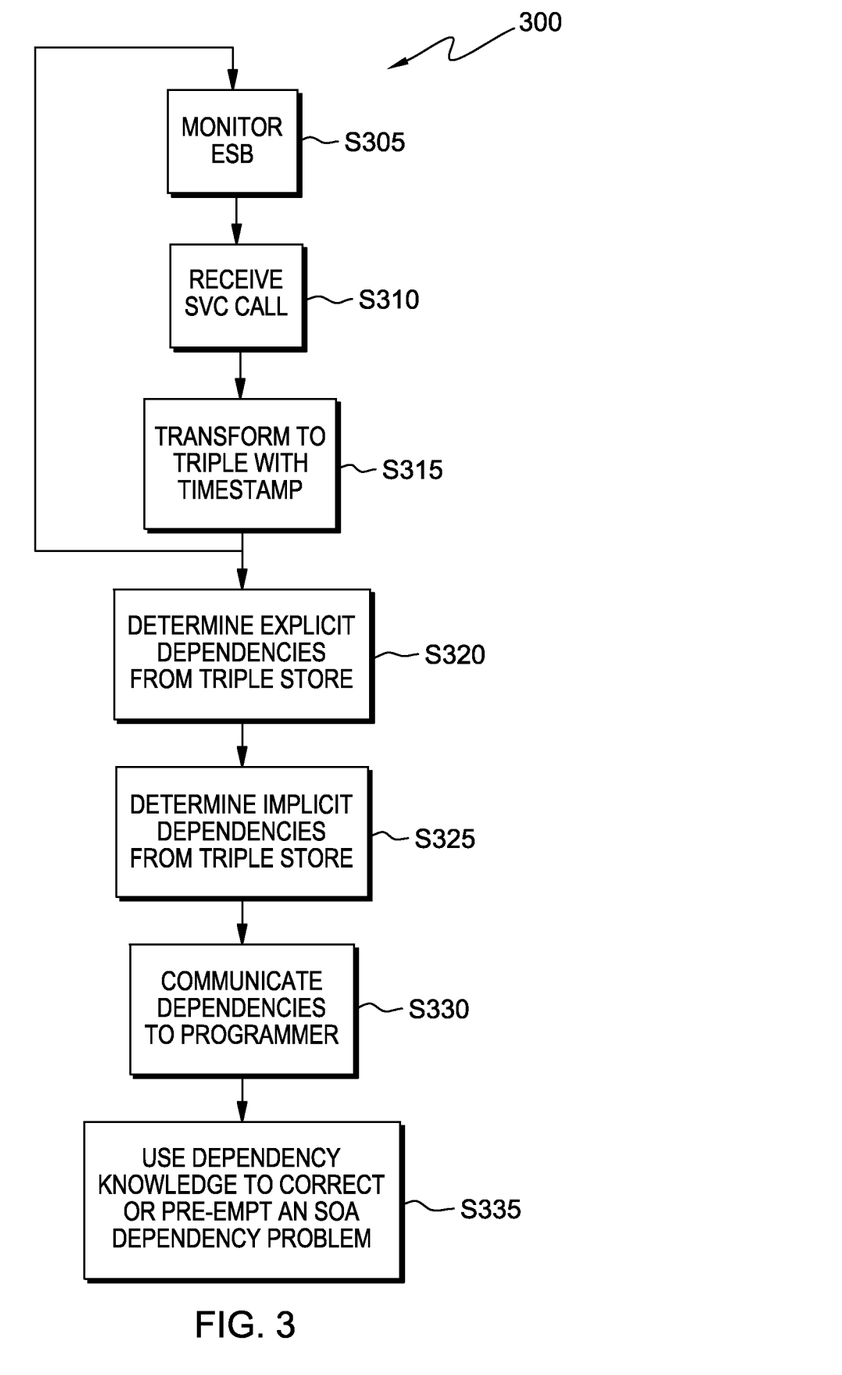
FIG. 3 is a flowchart showing a process performed, at least in part, by the first embodiment computer system.
Figure 4:
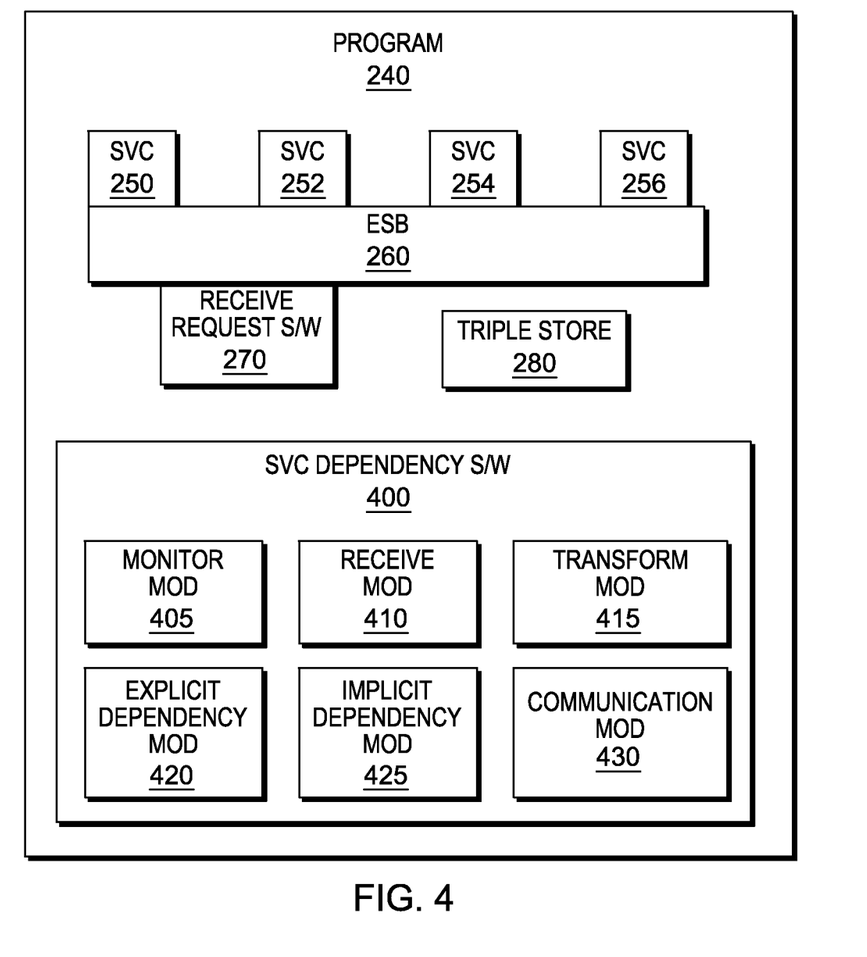
FIG. 4 is a schematic view of a software portion of the first embodiment computer system.

FIG. 3 shows a flow chart 300 depicting a method according to the present invention. FIG. 4 shows program 240 for performing at least some of the method steps of method 300. This method and associated software will now be discussed, over the course of the following paragraphs, with extensive reference to FIG. 3 (for the method step blocks) and FIG. 4 (for the software blocks).

An example of a working environment where the present invention operates will be discussed to help give context to method 300 of FIG. 3. A working environment example is where client computer sub-system 104 (see FIG. 1) invokes service 250 on server computer subsystem 102 (see FIGS. 1, 2, and 4) via network 114 (see FIG. 1). As shown in FIG. 4, services (SVC) 250, 252, 254, 256 are built upon SOA architecture including ESB 260. In this simplified embodiment, the ESB and all of the system-wide services are included in program 240 on a single server computer 200, but, as those of skill in the art will appreciate, this software is usually more widely distributed. More specifically, receive request software 270 receives the service invocation, of service 250, from client computer sub-system 104 and processes the request through ESB 260. After it has been invoked, service 250 makes a service call to service 252 through ESB 260. It should be noted that service "call," as used herein, refers only to a call from one service to another service. See the Definitions sub-section of this DETAILED DESCRIPTION section for a definition of service. Service "invocation" is used herein to refer to the requested use of an SOA service by an entity other than an SOA service.

Processing of method 300 (See FIG. 3) begins at step S305, where monitor module 405 monitors ESB 260 for service calls. In an SOA environment that includes an ESB, all service calls are routed through the ESB. The ESB promotes agility and flexibility with regard to communication and interaction between SVC 250, 252, 254, 256. In this embodiment of the present invention, the ESB further serves as a clearinghouse for all service calls so that these can be reliably tracked, as will be discussed in detail below.

A more detailed discussion in the context of a more detailed SOA environment can be found below in sub-section III of this Detailed Description, especially with reference to FIG. 6, an SOA solution stack diagram.

Processing proceeds to step S310, where monitor module 405 detects a service call and activates receive module 410. When a service call is made through ESB 260, receive module 410 receives the corresponding service call information from the ESB. Service call information includes, but is not limited to: (i) the requesting service; (ii) name of the called service; (iii) time of call; and/or (iv) date of call.

Continuing with the example above, service 250 requests service 252 by sending a service call over ESB 260 to service 252 on Jan. 5, 2013 at 5:20 pm. When the service call is made by service 250, receive module 410 receives service call information from the ESB. The service call information includes: (i) service 250 (the requesting service); (ii) service 252 (the name of the called service); (iii) 5:20 pm; and (iv) Jan. 5, 2013.

Processing proceeds to step S315, where transform module 415 transforms service call information into a triple format using resource description framework schema (RDFS). The RDF data model is similar to classic conceptual modeling approaches such as entity-relationship or class diagrams, as it is based upon the idea of making statements about resources (in particular web resources) in the form of subject-predicateobject expressions. These expressions are known as triples in RDF terminology. The subject denotes the resource, and the predicate denotes traits or aspects of the resource and expresses a relationship between the subject and the object. For example, one way to represent the notion "The sky has the color blue" in RDF is as the triple: a subject denoting "the sky", a predicate denoting "has the color", and an object denoting "blue". Therefore RDF swaps object for subject that would be used in the classical notation of an entity-attribute-value model within object-oriented design; object (sky), attribute (color) and value (blue).

RDFS (also variously abbreviated as RDF(S), RDF-S, or RDF/S) is a set of classes with certain properties using the RDF extensible knowledge representation language, providing basic elements for the description of ontologies, otherwise called RDF vocabularies, intended to structure RDF resources. These resources can be saved in a triple store to reach them with the query language SPARQL.

RDF is an abstract model with several serialization formats (i.e., file formats), and so the particular way in which a resource or triple is encoded varies from format to format. In the example above, one way the service call is transformed into a triple is as follows:

service-250 called service-252;
rdfs:timestamp <January 5, 2013, 17:20>.

Steps S305, S310, and S315 continue in a loop throughout operation of program 240. Transform module 415 records the triples associated with each set of service call information in triple store 280. The recorded triples of triple store 280 provide the foundation for an enterprise database that reflects service dependencies based on collected runtime data (the triples are added to the triple store as service calls are made on an on-going basis).

When a service dependency report is requested by a user, processing proceeds to step S320, where explicit dependency module 420 determines explicit service dependencies from triple store. Determining explicit service dependencies is the first of two steps to create a service dependency report. Explicit service dependencies are dependencies known from a single individual service call. For example, when service 250 calls service 254 (one service call), the explicit service dependency of service 250 to service 254 is revealed. Explicit service dependencies are determined by parsing the triples stored in triple store 280.

Processing proceeds to step S325, where implicit dependency module 425 determines implicit service dependencies from the collection of data in triple store 280. Implicit service dependencies are also revealed from the collection of triples in the triple store, but these dependencies require examination of two or more triples, corresponding to two or more service calls. For example, triple store 280 may contain the following triples:

(1) service-250 called service-252;
rdfs:timestamp <January 5, 2013, 17:20>.
(2) service-252 called service-256;
rdfs:timestamp <January 5, 2013, 17:21>.

The two triples above allow implicit dependency module 425 to create the implicit service dependency "service-250 depends on service-256."

Figure 5:
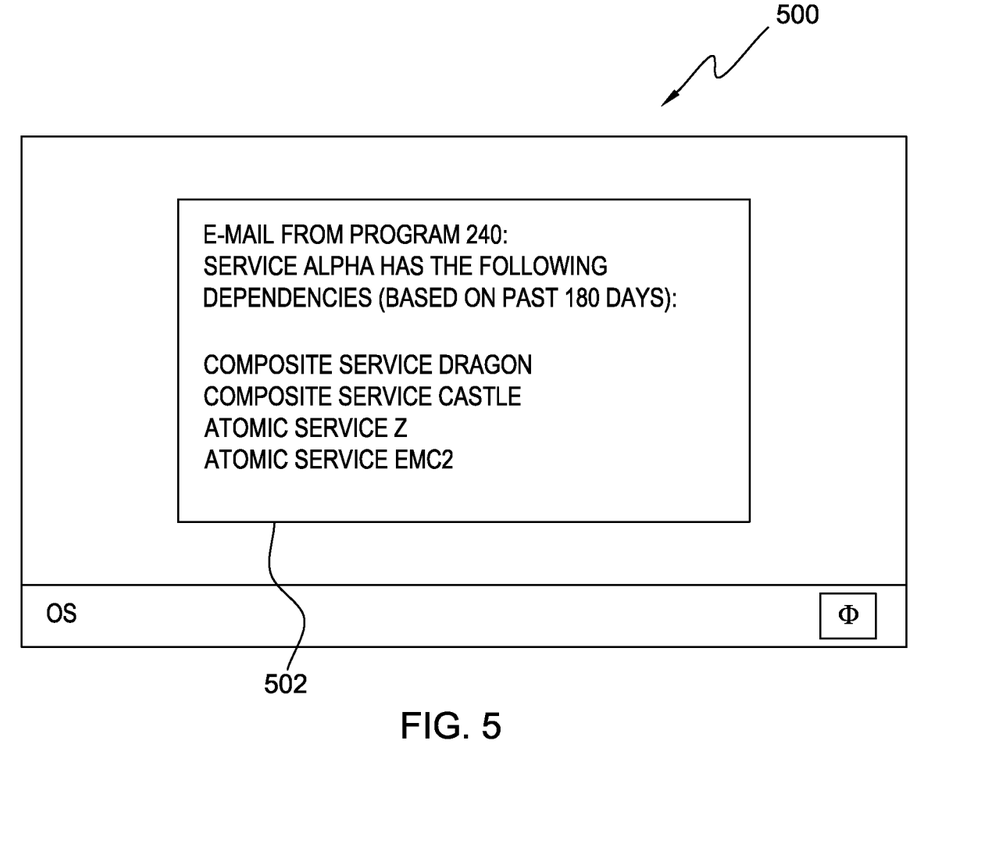
FIG. 5 is a screenshot generated by the first embodiment computer system.

Processing proceeds to step S330, where communication module 430, communicates service dependencies to a programmer. Upon query of service dependency software 400, the user is provided with all service dependencies through an enterprise over a specified period of time. FIG. 5 is a screenshot 500 showing an example of an e-mail communication 502 where service dependency software 400 reports services dependent on service alpha over the past 180 days. In this case the dependent services are further designated as atomic or composite services.

Processing proceeds to step S335, where the programmer uses the communicated dependencies of step S330 to correct or pre-empt an SOA dependency problem. Continuing with the examples used above, when a development team prepares to replace or modify service 256, a programmer on the team may request a service dependency report for service 256. The report will return the explicit dependency in the triple store, "service-252 called service-256; rdfs:timestamp <Jan. 5, 2013, 17:21>" and the implicit dependency "service-250 depends on service-256." The programmer then has the information required to pre-empt any dependency problems associated with services 252 and 250.

III. Further Comments and/or Embodiments

The present invention recognizes that many clients neglect to build in notions of governance and control around SOA architectures. As a result, it is difficult to know what application is consuming what service. If an application development team releases a composite service and the composite service is constructed using multiple atomic services (like building blocks), the application development team may have reused existing services to achieve this, and, in like manner, the completed composite service may in turn be reused by other teams.

A common experience in this type of environment is when a development team changes one of their services. For example, when a developer changes a port on a file including interface contract definition for service consumption, and the application teams that depend on this service are not made aware of this change in advance, several very important applications may suddenly stop working because appropriate adjustment for the port change was not made. It can take days of effort to trace the causation of the dependency-related problem. If appropriate governance measures are available and are followed, change management procedures may be applied when the interface control definition file is edited by a development team to correct the dependency problem.

One way to enhance knowledge regarding what service(s) are consumed by an application is to enact governance. At least some embodiments of the present invention work automatically under control of software and therefore remove the need for: (i) an SOA governance team; (ii) keeping track of all the services being offered and the teams using them; (iii) keeping manual registration system up to date; (iv) UDDI (Universal Description Discovery and Integration) repositories; and/or (v) compliance policies associated with UDDI repositories. Some embodiments of the present invention provide for automated tracking in a large-scale services environment (that is, large-scale SOA environment). Adoption of these embodiments mitigates the need for manual registration techniques, and at the same time removes pressure from development staff to comply with governance policies.

A common technology component in an SOA environment is an ESB. An ESB accepts a request from one service to consume another service, and makes the call possible. This frees up the need for point-to-point connections. An ESB has the ability to track which service called which service. Assuming all calls are routed through the ESB (which is generally the case in SOA environments that have EDBs), all service calls can be tracked. Some embodiments of the present invention provide a method including the steps: (i) service calls are logged when communicated through an ESB; (ii) transformed (at runtime) into a triple-based (RDF) format; (iii) saved to a triple store; and (iv) the triple store is used to determine SOA dependencies. In the above example, where one service is calling another service, the service call information would be saved in the form of a triple having the following format:

```
service-a called service-b;
rdfs:timestamp <timestamp>.
```

Some embodiments of the present invention establish a well-defined ontology of the entire enterprise system that can be leveraged. In some embodiments, this ontology will describe every application in the enterprise, down to atomic service definitions. In some embodiments, this ontology is used in connection with the RDF triples generated and saved, as stated above, at runtime.

A sample ontology follows:

```
Application
    application-alpha
    application-beta
Service
    BusinessService
    CompositeService
    AtomicService
        service-a
        service-b
application-alpha composedOf service-a
application-beta composedOf service-b
```

In a simplified ontology example, which will now be discussed, the SOA environment includes two applications: (i) application alpha; and (ii) application beta. Application alpha is composed of a single atomic service (service-a) and application beta is composed of a single atomic service (service-b). Application alpha calls application beta through the ESB. In this embodiment, during runtime, the call to application beta is stored in the triple store along with the occurrence date. So now, if a development team is going to make changes to service-b, they can query the triple store to find all other services that have called service-b in the last X days (last 30 days, last 60 days, etc). The query will return, by inference, application alpha as being related to service-b, if the latest call was made within the specified time frame. In summary, once the services that have called service-b over a period of time are recovered, by virtue of the ontology and saved data in the triple store, additional dependencies may be inferred so that all the dependencies, both asserted and inferred, to service-b will be known.

Some embodiments of the present invention include a change management system programmed to check the triple store if a service is changed and send a report back to the development team.

Some embodiments of the present invention bypass the idea of having to register service dependencies manually with Vendor SOA-related products, such as Enterprise Service Bus Process Server, or Service Registry and Repository. Once services are described in the ontology (one-time) these will be tracked in the ESB automatically, and the dependency patterns will be determined by software. By querying the triple store of these call patterns, and limiting the query to some time interval of interest (such as last 30 days), services that no longer depend on each other will not be returned. For example, in some embodiments, service dependencies change so frequently, that if service-a calls service-b, but that call was recorded several months, or even over a year ago, it may be assumed that the dependency no longer exists. In embodiments where the specified time interval is "last X days," the triple store inherently contains the latest calls and understands the backing business dependencies as these currently exist at the time of a dependency query to the dependency determining software.

Figure 6:
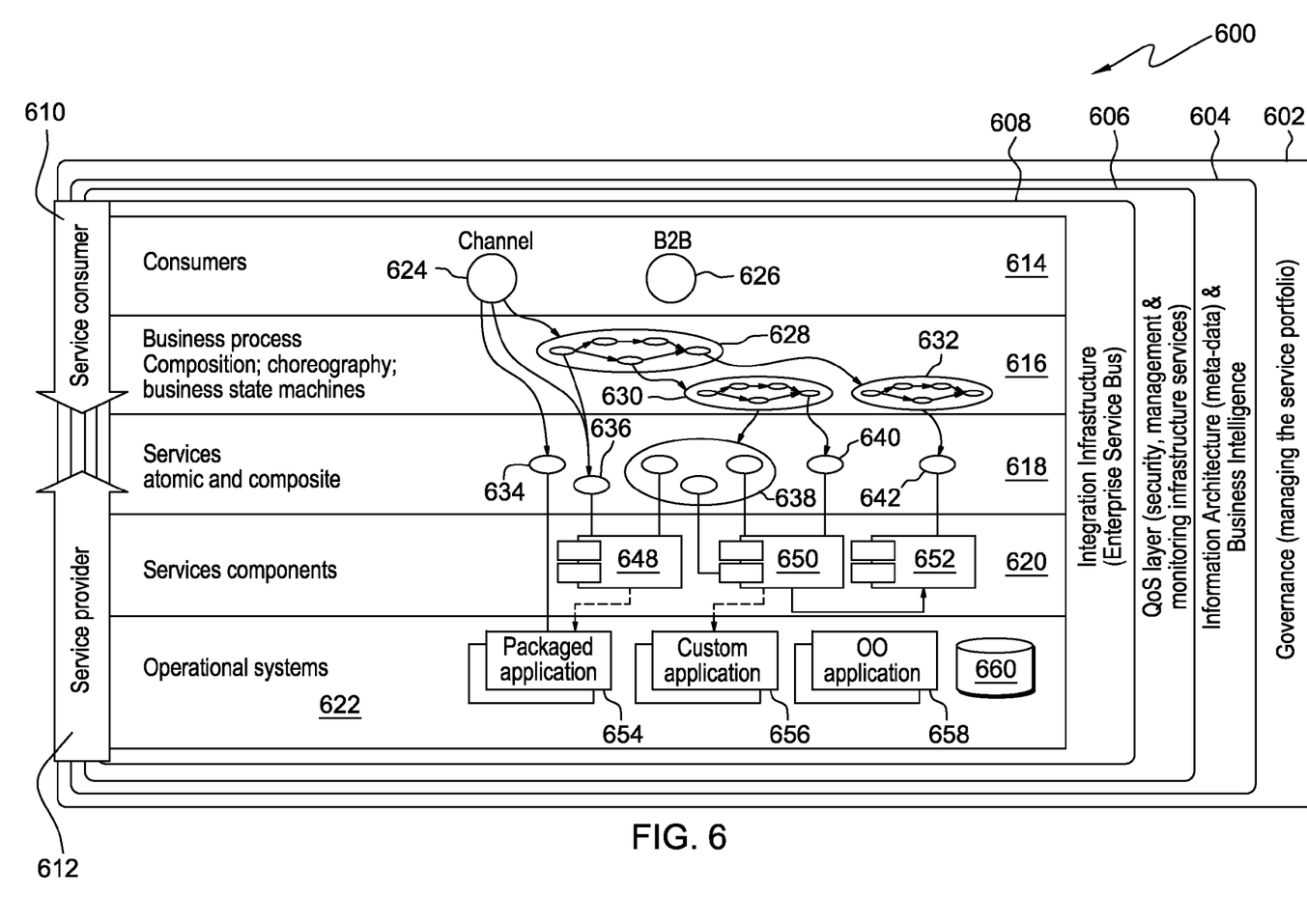
FIG. 6 is a block diagram of one embodiment of an SOA solution stack according to the present invention.

FIG. 6 is a block diagram of one embodiment of an SOA solution stack according to the present invention. The block diagram 600 includes: governance layer 602 (managing the service portfolio); information architecture (meta-data) and business intelligence layer 604; QoS layer 606 (security, management and monitoring infrastructure services); integration infrastructure layer 608 (enterprise service bus); service consumer flow direction 610; service provider flow direction 612; consumers division 614; business process composition, choreography, business state machines division 616; services division (atomic and composite) 618; service components division 620; operational systems division 622; channel 624; business to business 626; composite services made up of composite services 628, 630, 632; atomic services 634, 636, 640, 642; composite services made up of atomic services 638; service components 648, 650, 652; packaged application 654; custom application 656; object-oriented application 658; and service registry 660.

Some embodiments of the present invention inspects dependency data dynamically (that is, on an on-going basis and without substantial human intervention) and stores the data in RDF format. In other words, the dependency is dynamically detected rather than someone manually entering the data.

Some embodiments of the present invention go beyond capturing the AS-IS process in an SOA environment.

Some embodiments of the present invention use an ontology that describes the entire enterprise system. In that way, the relation between two composable services and the entire system is known, not just the point-to-point dependency between the two composable services. Accordingly, dependencies are determined, not only from one service to another, but between one system and another (essentially determining dependencies at any level).

In some embodiments of the invention, a triple store provides a way for a user to infer dependencies, rather than just using explicit metadata. For example, if the automated registration system captures that "system-a depends on service-b" and "system-a contains service-x," then an inference can be made that "service-x depends on service-b."

In some embodiments of the present invention, when a service is changed, downstream implications are called out through the use of automatically generated triple stores as part of automatic governance that are not even dependent on a common registration of the services.

In some embodiments of the present invention, a list of which clients use which service is automatically maintained through the use of the triple store, which is built over time with the system running, or dynamic inspection through semantic technology.

In some embodiments of the present invention, services being consumed within larger composite applications (such as, for example, 100,000 or more services) are inspected dynamically (from a triple store). This provides the knowledge to know and mitigate breaking applications when making updates by understanding what services are consuming what other services.

Some embodiments of the present invention use semantic technology to provide a dynamic inter-service dependency in the context of an enterprise ontology.

Some embodiments of the present invention populate a triple store with: (i) explicit triples; and (ii) implied triples. Implied triples are created when the system makes an inference regarding a service dependency. Other embodiments of the present invention include only explicit triples in the triple store. In these embodiments, any inferential dependencies are determined by the system in response to a query at the time the query is received. When the inference is made and/or stored is an implementation decision and does not affect the functionality of the system or the ability of the system to make an inference. However, this design choice generally impacts the query response time.

Some embodiments of the present invention use reasoners (either industry standard reasoners or customized ones) to provide automated inferences. The choice of reasoner is driven by design choice with consideration given to optimization and efficiency.

Some embodiments of the present invention include a well-defined ontology for the enterprise system, such that the triples that are created conform to this ontology. This potentially has some important ramifications. Given a well-defined ontology, properties can exist on predicate definitions that allow inference. A simple example of inference is if service A calls service B and service B calls service C, then there is a dependency from service A to service C. Thus, the applications that contain services A and C are now known to be dependent.

Some embodiments of the present invention have an ontology that goes beyond four basic relationships (such as, is-a, deploy, use, offer). Some embodiments use timestamps (recording calls from an ESB at runtime) for a real time/historical picture of service dependencies.

Some embodiments of the present invention go beyond all of the following: (i) performing a discovery process once with no ongoing changes; (ii) performing a static discovery process; and (iii) performing an incremental discovery process with stale data. As mentioned above, some embodiments of the present invention perform discovery of triples that has one or more of the following characteristics, features, and/or advantages: (i) dynamic discovery of triples; and/or (ii) discovery of triples based on service call transmission over an ESB.

Some embodiments of the present invention track developers and/or teams responsible for each component of the SOA environment.

Some embodiments of the present invention use cloud storage to make the triple store more accessible across the enterprise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general understanding for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/subscriber: includes, but is not necessarily limited to, the following: (i) a single individual human; (ii) an artificial intelligence entity with sufficient intelligence to act as a user or subscriber; and/or (iii) a group of related users or subscribers.

Service: a service includes, but is not limited to, the following: (i) atomic service; (ii) composite service; and (iii) application-level service.

What is claimed is:

1. A method for determining a dependency of a first service upon a second service in a service oriented architecture environment, the method comprising the steps of:

recording a first triple describing a first service call where the first service calls the second service;

recording a second triple describing a second service call where the second service calls a third service;

determining the first service is dependent upon the second service based, at least in part, upon the first triple; and determining the first service is dependent upon the third service based, at least in part, upon the second triple;

determining the first service is dependent upon the third service based, at least in part, upon an inferred dependency;

wherein:

the recording a first triple step is performed dynamically, the recording occurring when the first service call is made; and at least the recording and determining steps are performed by computer software running on computer hardware.

2. The method of claim 1, further comprising the step of:

communicating the first service call through an enterprise service bus (ESB);

wherein:

the recording step further accesses the first service call on the ESB for recording purposes.

3. The method of claim 1, wherein the recording step further records the first triple to a timestamp indicating a first point in time when the first service call is made.

4. The method of claim 3, further comprising:

responsive to a request for a service dependency report for a period of time including the first point in time, reporting a first service dependency.

5. The method of claim 1, wherein determining the first service is dependent upon the second service is based, at least in part, upon one of the following dependency types: asserted, and inferred.

6. A computer program product for determining a dependency of a first service upon a second service in a service oriented architecture environment, the computer program product comprising a non-transitory machine-readable storage medium storing instructions, the computer program product comprising:

first program instructions programmed to record a first triple describing a first service call where the first service calls the second service;

second program instructions programmed to record a second triple describing a second service call where the second service calls a third service;

third program instructions programmed to determine the first service is dependent upon the second service based, at least in part, upon the first triple;

fourth program instructions programmed to determine the first service is dependent upon the third service based, at least in part, upon the second triple; and fifth program instructions programmed to determine the first service is dependent upon the third service based, at least in part, upon an inferred dependency;

wherein:

the first program instructions are programmed to record the first triple dynamically, the recording occurring when the first service call is made; and the software is stored on a software storage device in a manner less transitory than a signal in transit.

7. The computer program product of claim 6, wherein the first program instructions are further programmed to record the first triple to a timestamp indicating a first point in time when the first service call is made.

8. The computer program product of claim 7, further comprising:

third program instructions programmed to, responsive to a request for a service dependency report for a period of time including the first point in time, report the first service dependency.

9. The computer program product of claim 6, further comprising:

third program instructions programmed to communicate the first service call through an enterprise service bus;

wherein:

the third program instructions are further programmed to access the first service call on the enterprise service bus for recording purposes.

10. The computer program product of claim 6, wherein the second program instructions are further programmed to determine the first service is dependent upon the second service based, at least in part, upon one of the following dependency types: asserted, and inferred.

11. A computer system for determining a dependency of a first service upon a second service in a service oriented architecture environment, the computer system comprising:

a processor(s) set; and a software storage device;

wherein:

the processor set is structured, located, connected and/or programmed to run software stored on the software storage device; and the software comprises:

first program instructions programmed to record a first triple describing a first service call where the first service calls the second service;

second program instructions programmed to record a second triple describing a second service call where the second service calls a third service;

third program instructions programmed to determine the first service is dependent upon the second service based, at least in part, upon the first triple;

fourth program instructions programmed to determine the first service is dependent upon the third service based, at least in part, upon the second triple; and fifth program instructions programmed to determine the first service is dependent upon the third service based, at least in part, upon an inferred dependency;

wherein:

the first program instructions are programmed to record the first triple dynamically, the recording occurring when the first service call is made.

12. The computer system of claim 11, wherein the first program instructions are further programmed to record the first triple to a timestamp indicating a first point in time when the first service call is made.

13. The computer system of claim 12, the software further comprising:

third program instructions programmed to, responsive to a request for a service dependency report for a period of time including the first point in time, report the first service dependency.

14. The computer system of claim 11, the software further comprising:

third program instructions programmed to communicate the first service call through an enterprise service bus;

wherein:

the third program instructions are further programmed to access the first service call on the enterprise service bus for recording purposes.

15. The computer system of claim 11, wherein the second program instructions are further programmed to determine the first service is dependent upon the second service based, at least in part, upon one of the following dependency types: asserted, and inferred.

* * * * *